United States Patent [19]

Jaggard et al.

[11] 4,385,162

[45] May 24, 1983

[54] PREPARATION OF HOMOPOLYMERS AND COPOLYMERS OF α-MONO-OLEFINS BY MEANS OF A ZIEGLER-NATTA CATALYST SYSTEM

[75] Inventors: James F. R. Jaggard, Ludwigshafen; Peter Klaerner, Battenberg; Guenther Schweier, Friedelsheim, all of Fed. Rep. of Germany

[73] Assignee: BASF Aktiengesellschaft, Fed. Rep. of Germany

[21] Appl. No.: 256,129

[22] Filed: Apr. 21, 1981

[30] Foreign Application Priority Data

May 12, 1980 [DE] Fed. Rep. of Germany ....... 3018113

[51] Int. Cl.$^3$ .......................... C08F 4/64; C08F 10/00
[52] U.S. Cl. ................. 526/142; 252/429 B; 526/351; 526/906
[58] Field of Search ......................................... 526/142

[56] References Cited

U.S. PATENT DOCUMENTS

| | | | |
|---|---|---|---|
| 3,701,763 | 10/1972 | Wada et al. | 526/142 |
| 4,120,823 | 10/1978 | Mueller-Tamm | 526/142 |
| 4,154,699 | 5/1979 | Mueller-Tamm | 526/142 |
| 4,154,700 | 5/1979 | Mueller-Tamm | 526/142 |
| 4,229,318 | 10/1980 | Mueller-Tamm | 526/142 |
| 4,260,710 | 4/1981 | Strieger et al. | 526/142 |

*Primary Examiner*—Edward J. Smith
*Attorney, Agent, or Firm*—Keil & Witherspoon

[57] ABSTRACT

A process for the preparation of homopolymers and copolymers of α-monoolefins by means of a Ziegler-Natta catalyst system comprising (1) a titanium-III component, which is prepared by subjecting (1.1) a titanium trichloride/aluminum trichloride compound (a) and (1.2) an ester (b) to a certain type of milling treatment in which (A) a vibratory ball mill providing a relatively high milling acceleration is used, (B) the mill is first charged with the titanium-containing compound (a) and, if appropriate, is run for a certain period, thereafter (C) the ester (b) is added at a certain rate while milling the charge, thereupon (D) the charge is kept at $+15°$ C. or above for a certain period, while continuing the milling, hereupon (E), if appropriate, the product obtained from (D) is milled further for a certain period at $+5°$ C. or below, then (F), if appropriate, but advantageously so, the product obtained from (D) or (E) is kept at $+20°$ C. or above for a certain period, without milling, and thereafter (G), if appropriate, the product obtained from (F) is milled further for a certain period at $+5°$ C. or below, (2) an aluminum-alkyl component containing a chlorine bonded to the aluminum, and (3), if appropriate, a phenolic compound of a certain category, in which process a titanium-III component (1) is employed, in the preparation of which additionally $-$(H) a suspension is prepared from (H$_1$) the product obtained according to (D), (E), (F) or (G), (H$_2$) a liquid hydrocarbon (c) and (H$_3$) an oxygen-containing compound (d), consisting of (d$_1$) an ether of a certain category and/or (d$_2$) an ester of a certain category, thereafter (I) the suspension obtained according to (H) is kept at an elevated temperature for a certain period, with vigorous agitation, and is then cooled, hereupon (J), if appropriate, the solid is isolated from the suspension obtained according to (I), and, if desired, is washed with a liquid hydrocarbon and dried, the novel titanium-III component (1) being the solid, in suspended form, obtained according to (I) or the solid, in isolated form, obtained according to (J). Using this Ziegler-Natta catalyst system, polymers with relatively high stereoregularity and advantageous morphological properties can be obtained in relatively high yield.

1 Claim, No Drawings

PREPARATION OF HOMOPOLYMERS AND COPOLYMERS OF α-MONO-OLEFINS BY MEANS OF A ZIEGLER-NATTA CATALYST SYSTEM

The present invention is based on a process for the preparation of homopolymers and copolymers of $C_2$-$C_6$-α-monoolefins at from 20° to 160° C., especially from 50° to 120° C., under a pressure of from 1 to 100 bar, especially from 20 to 70 bar, by means of a Ziegler-Natta catalyst system comprising (1) a titanium-III component, in the preparation of which (1.1) a titanium-containing compound (a) of the formula

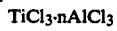

$$TiCl_3 \cdot nAlCl_3$$

where n is a number from 0.01 to 1, especially from 0.1 to 0.4, and (1.2) an ester (b), which in total contains from 2 to 34, especially from 2 to 18, carbon atoms, and has the formula

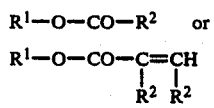

$$R^1-O-CO-R^2 \quad \text{or}$$
$$R^1-O-CO-C=CH$$
$$\phantom{R^1-O-CO-}|\phantom{C}|$$
$$\phantom{R^1-O-CO-}R^2\ R^2$$

where
$R^1$ is (I) alkyl of 1 to 16, especially of 1 to 8, carbon atoms, or (II) phenylalkyl of a total of 7 to 23, especially 7 to 14, carbon atoms, in which up to 5 hydrogens of the phenyl may be substituted by alkyl of 1 to 4 carbon atoms, and
$R^2$ is (I) hydrogen, (II) alkyl of 1 to 18, especially of 2 to 12, carbon atoms, (III) phenylalkyl of a total of 7 to 23, especially 7 to 14, carbon atoms, in which up to 5 hydrogens of the phenyl may be substituted by alkyl of 1 to 4 carbon atoms, (IV) phenyl or (V) alkylphenyl of a total of 7 to 23, especially 7 to 14, carbon atoms, in which up to 5 hydrogens of the phenyl may be substituted by alkyl of 1 to 4 carbon atoms, are subjected to a milling treatment wherein (A) a vibratory ball mill having a milling acceleration of from 30 to 80, especially from 45 to 55, m. sec$^{-2}$ is used, (B) the mill is first charged with the titanium-containing compound (a) and, if appropriate, is run at from −50 to +100° C., especially from −30° to +50° C., for a period of from 0.5 to 100, especially from 2 to 20, hours, in the absence of a diluent, then (C) whilst milling the charge at from −50° to +80° C., especially from −30° to +60° C., the amount of the ester (b) which corresponds to a molar ratio of titanium in the titanium-containing compound (a) to ester (b) of from 1:1.5 to 1:0.01, especially from 1:0.7 to 1:0.1, is added continuously, or a little at a time, in the absence of a diluent, at a rate of from 0.01 to 200, especially from 1 to 80, ml/min per 2.5 kg of titanium-containing compound (a), thereupon (D) the charge is milled for a period of from 1 to 120, especially from 20 to 70, hours at from +15° to +100° C., especially from +20° to +60° C., hereupon (E) if appropriate, the product obtained according to (D) is milled further for a period of from 0.5 to 60, especially from 2 to 30, minutes at from −50° to +5° C., especially from −40° to 0° C., in the absence of a diluent, then (F) if appropriate, but advantageously so, the product obtained according to (D) or (E) is kept, without milling, at from +20° to +150° C., especially from +45° to +100° C., for a period of from 0.25 to 300, especially from 2 to 150, hours, and thereafter (G) if appropriate, the product obtained according to (F) is milled further, in the absence of a diluent, for a period of from 0.5 to 60, especially from 2 to 30, minutes at from −50° to +5° C., especially from −40° to 0° C., (2) an aluminum-alkyl component of the formula

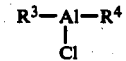

$$R^3-\underset{\underset{Cl}{|}}{Al}-R^4$$

where $R^3$ and $R^4$ are identical or different and each is alkyl of 1 to 8, especially of 2 to 4, carbon atoms, and (3) if appropriate, but advantageously, a phenolic compound of the formula

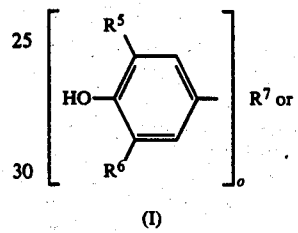

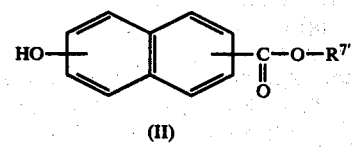

where
$R^5$ is $C_1$-$C_6$-alkyl, especially $C_3$-$C_4$-alkyl,
$R^6$ is hydrogen or $C_1$-$C_6$-alkyl, especially $C_3$-$C_4$-alkyl,
$R^7$ is hydrogen or a saturated hydrocarbon radical of not more than 30, in particular not more than 24, carbon atoms, which may or may not contain up to 6, in particular up to 4, ether groups and/or ester groups,
$R^{7'}$ is $C_2$-$C_{24}$-alkyl, especially $C_4$-$C_{18}$-alkyl and
o is an integer from 1 to 6, especially from 1 to 4, with the proviso that the atomic ratio of titanium from the titanium-III component (1) to aluminum from the aluminum-alkyl component (2) is from 1:1 to 1:20, especially from 1:2 to 1:15, and that, where relevant, the molar ratio of aluminum-alkyl component (2) to phenolic compound (3) is from 1:1 to 40:1, especially from 3:1 to 25:1.

Processes of this type are known; their special feature in relation to comparable other processes resides in the specific nature of the catalyst systems; prototypes of the catalyst system used in the present instance include those disclosed in German Laid-Open Applications DOS 2,658,939 (=U.S. Pat. No. 4,154,699) and DOS 2,841,645.

The specific embodiments of the catalyst system are aimed at achieving particular objectives, for example the following:

(a) catalyst systems which when used for the polymerization of α-monoolefins, especially propylene, give products containing a high proportion of stereoregular (=isotactic) polymer.

(b) Catalyst systems which can give an increased yield of polymer, namely systems which have a higher productivity, ie. systems in which the amount of polymer formed per unit weight of the catalyst system is increased.

(c) Catalyst systems by means of which less halogen is introduced into the polymer, this being achievable by increasing the yield according to (b) and/or employing a titanium halide which contains very little halogen.

(d) Catalyst systems whose maximum activity remains constant or relatively constant for a very long period, this being an important factor in the catalyst efficiency.

(e) Catalyst systems by means of which it is possible to achieve an increase in conversion by increasing the polymerization temperature, without significantly diminishing the stereoregularity of the polymers, such an increase being generally desirable, in particular in dry phase polymerization.

(f) Catalyst systems by means of which it is possible, especially at relatively high polymerization temperatures, to influence the morphological properties of the polymers in a certain way, for example in the sense of giving a uniform particle size and/or reducing the proportion of fines and/or giving a high bulk density; this can be of importance, for example, in the technical control of the polymerization systems, in working up the polymers and/or in respect of the processability of the polymers obtained.

(g) Catalyst systems which are simple and safe to prepare and easy to handle; for example, systems which can be prepared in (inert) hydrocarbon auxiliary media.

(h) Catalyst systems which make it possible, where the polymerization is carried out using a molecular weight regulator, especially hydrogen, to manage with relatively small amounts of such a regulator; this can, for example, be important as regards the thermodynamics of the process.

(i) Catalyst systems tailored to specific polymerization processes, for example those intended to suit either the specific peculiarities of suspension polymerization or the specific peculiarities of dry phase polymerization.

(j) Catalyst systems which give polymers whose spectrum of properties makes them particularly suitable for some special field of application.

According to experience gathered hitherto, there are, amongst these numerous objectives, some which can only be achieved by special embodiments of the catalyst system if other objectives are lowered.

Under these circumstances the endeavor is generally to find embodiments with which not only the particular objectives are achieved but other desired objectives need be lowered as little as possible.

The present invention also conforms to this latter pattern. Its object is to provide a novel embodiment of a catalyst system with which it is possible, compared to conventional systems, to operate at relatively high temperatures, with correspondingly relatively high yields of polymer, and to obtain polymers which have a relatively higher stereoregularity (+isotacticity) and additionally in particular also have advantageous morphological properties, such as a low content of fines.

We have found that this object is achieved with a catalyst system of the type defined at the outset, wherein the titanium-III component (1), after milling, is subjected to an additional specific chemical treatment.

Accordingly, the present invention relates to a process for the preparation of homopolymers and copolymers of $C_2$-$C_6$-α-monoolefins at from 20° to 160° C., especially from 50° to 120° C., under a pressure of from 1 to 100 bar, especially from 20 to 70 bar, by means of a Ziegler-Natta catalyst system comprising (1) a titanium-III component, in the preparation of which (1.1) a titanium-containing compound (a) of the formula

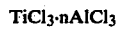

$$TiCl_3 \cdot nAlCl_3$$

where n is a number from 0.01 to 1, especially from 0.1 to 0.4, and (1.2) an ester (b), which in total contains from 2 to 34, especially from 2 to 18, carbon atoms, and has the formula

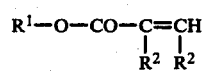

$$R^1-O-CO-R^2 \quad \text{or}$$
$$R^1-O-CO-\underset{R^2}{C}=\underset{R^2}{CH}$$

where
$R^1$ is (I) alkyl of 1 to 16, especially of 1 to 8, carbon atoms, or (II) phenylalkyl of a total of 7 to 23, especially 7 to 14, carbon atoms, in which up to 5 hydrogens of the phenyl may be substituted by alkyl of 1 to 4 carbon atoms, and $R^2$ is (I) hydrogen, (II) alkyl of 1 to 18, especially of 2 to 12, carbon atoms, (III) phenylalkyl of a total of 7 to 23, especially 7 to 14, carbon atoms, in which up to 5 hydrogens of the phenyl may be substituted by alkyl of 1 to 4 carbon atoms, (IV) phenyl or (V) alkylphenyl of a total of 7 to 23, especially 7 to 14, carbon atoms, in which up to 5 hydrogens of the phenyl may be substituted by alkyl of 1 to 4 carbon atoms, are subjected to a milling treatment wherein (A) a vibratory ball mill having a milling acceleration of from 30 to 80, especially from 45 to 55, m. sec$^{-2}$ is used, (B) the mill is first charged with the titanium-containing compound (a) and, if appropriate, is run at from −50° to +100° C., especially from −30° to +50° C., for a period of from 0.5 to 100, especially from 2 to 20, hours, in the absence of a diluent, then (C) whilst milling the charge at from −50° to +80° C., especially from −30° to +60° C., the amount of the ester (b) which corresponds to a molar ratio of titanium in the titanium-containing compound (a) to ester (b) of from 1:1.5 to 1:0.01, especially from 1:0.7 to 1:0.1, is added continuously, or a little at a time, in the absence of a diluent, at a rate of from 0.01 to 200, especially from 1 to 80, ml/min per 2.5 kg of titanium-containing compound (a), thereupon (D) the charge is milled for a period of from 1 to 120, especially from 20 to 70, hours at from +15° to +100° C., especially from +20° to +60° C., hereupon (E) if appropriate, the product obtained according to (D) is milled further for a period of from 0.5 to 60, especially from 2 to 30, minutes at from −50° to +5°

C., especially from -40° to 0° C., in the absence of a diluent, then (F) if appropriate, but advantageously so, the product obtained according to (D) or (E) is kept, without milling, at from +20° to +150° C., especially from +45° to +100° C., for a period of from 0.25 to 300, especially from 2 to 150, hours, and thereafter (G) if appropriate, the product obtained according to
(F) is milled further, in the absence of a diluent, for a period of from 0.5 to 60, especially from 2 to 30, minutes at from -50° to +5° C., especially from -40° to 0° C., (2) an aluminum-alkyl component of the formula

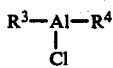

where $R^3$ and $R^4$ are identical or different and each is alkyl of 1 to 8, especially of 2 to 4, carbon atoms, and (3) if appropriate, but advantageously, a phenolic compound of the formula

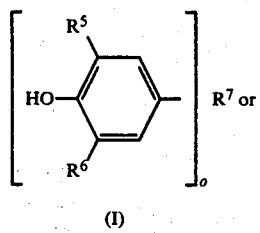

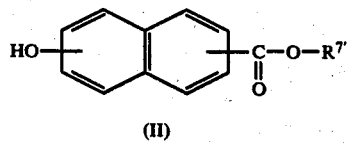

where
$R^5$ is $C_1$-$C_6$-alkyl, especially $C_3$-$C_4$-alkyl,
$R^6$ is hydrogen or $C_1$-$C_6$-alkyl, especially $C_3$-$C_4$-alkyl,
$R^7$ is hydrogen or a saturated hydrocarbon radical of not more than 30, in particular not more than 24, carbon atoms, which may or may not contain up to 6, in particular up to 4, ether groups and/or ester groups,
$R^{7'}$ is $C_2$-$C_{24}$-alkyl, especially $C_4$-$C_{18}$-alkyl and
o is an integer from 1 to 6, especially from 1 to 4,
with the proviso that the atomic ratio of titanium from the titanium-III component (1) to aluminum from the aluminum-alkyl component (2) is from 1:1 to 1:20, especially from 1:2 to 1:15, and that the molar ratio of aluminum-alkyl component (2) to phenolic compound (3) is from 1:1 to 40:1, especially from 3:1 to 25:1, wherein a titanium-III component (1) is employed, in the preparation of which additionally (H) a suspension is prepared from
($H_1$) 1 part by weight of the product obtained according to (D), (E), (F) or (G),
($H_2$) from 0.5 to 20, especially from 0.7 to 2, parts by weight of a hydrocarbon (c) which is liquid under normal conditions and boils below 150° C., especially below 100° C., and
($H_3$) an oxygen-containing compound (d), consisting of ($d_1$) an ether which in total contains from 4 to 30, especially from 6 to 16, carbon atoms, and has the formula

where $R^8$ and $R^{8'}$ may be identical or different and each is (I) alkyl of 1 to 15, especially of 3 to 8, carbon atoms, (II) phenyl or (III) alkylphenyl of a total of 7 to 14, especially 7 to 10, carbon atoms, and/or ($d_2$) an ester which in total contains from 2 to 34, especially from 2 to 14, carbon atoms, and has the formula

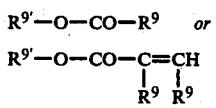

where
$R^9$ is (I) hydrogen, (II) alkyl of 1 to 12, especially of 1 to 9, carbon atoms, (III) phenylalkyl of a total of 7 to 14, especially 7 to 10, carbon atoms, in which 1 hydrogen of the phenyl may be substituted by alkyl, (IV) phenyl or (V) alkylphenyl of a total of 7 to 14, especially 7 to 10, carbon atoms, and
$R^{9'}$ is (I) alkyl of 1 to 8, especially of 1 to 4, carbon atoms, (II) phenyl or (III) phenylalkyl of a total of 7 to 14, especially 7 to 10, carbon atoms, in such amount that the molar ratio of titanium from the titanium-containing compound (a) to oxygen-containing compound (d) is from 1:0.01 to 1:2, especially from 1:0.08 to 1:0.5, thereafter (I) the suspension obtained according to (H) is kept at from +40° to +140° C., especially from +50° to +95° C., for from 5 to 120, especially from 15 to 60, minutes, with vigorous agitation, and is then brought to from +15° to +25° C., and hereupon.

(J), if appropriate, the solid is isolated from the suspension obtained according to (I), and, if desired, is washed with a hydrocarbon which is liquid under normal conditions and boils below 150° C., especially below 100° C., and is dried, the novel titanium-III component (1) being the solid, in suspended form, obtained according to (I) or the solid, in isolated form, obtained according to (J).

The following details may be noted concerning the process according to the invention:

The polymerization process as such can, taking into account the characterizing features, be carried out in virtually all relevant conventional technological embodiments, ie. as a batchwise, cyclic or continuous process, which may be, for example, a suspension polymerization process or dry phase polymerization process. The technological embodiments mentioned, ie., the technological embodiments of a Ziegler-Natta polymerization of α-monoolefins, are well known from the literature and from industrial practice, and accordingly further details need not be given here.

In the process according to the invention, the molecular weights of the polymers can be regulated by the relevant conventional methods, for example by means of regulators, especially hydrogen.

Further, in the process according to the invention the components of the catalyst system can be introduced into the polymerization space in various ways; for example (i) the titanium component (1), the aluminum-alkyl component (2) and, where relevant, the phenolic compound (3) can all be introduced at the same position, (ii) the said components can all be introduced at different positions, (iii) the component (1) can be added at one position and a mixture of the components (2) and (3) at another, separate position (which can, in particular, be advantageous in the case of dry phase polymerization processes) or (iiii) a mixture of components (1) and (3) can be added at one position and component (2) at another, separate position.

Finally, it is to be noted that the advantageous features of the process according to the invention in general manifest themselves particularly in dry phase polymerization (of which typical examples are to be found, for example, in German Published Applications DAS 1,217,071, DAS 1,520,307 and DAS 1,520,373).

Concerning the materials employed in the novel catalyst system, the following details may be noted:

(1) The titanium-III component.

The titanium-containing compounds (a), serving as starting materials for this component and having the formula stated, are the relevant conventional compounds, for example those obtainable by co-crystallizing $TiCl_3$ and $AlCl_3$ or by reducing $TiCl_4$ with aluminum or a mixture of aluminum and titanium. Co-crystals of the formula $TiCl_3 \cdot \frac{1}{3} AlCl_3$ are particularly suitable. The relevant titanium-containing compounds (a) are commercially available, so that further details are unnecessary.

Suitable esters (b), having the stated formula, are the relevant conventional esters of this formula, especially those where $R^1$ is methyl, ethyl, n-propyl, i-propyl, n-butyl, i-butyl, tert.-butyl, n-pentyl, i-pentyl, n-hexyl or benzyl, and $R^2$ is hydrogen, methyl, ethyl, n-propyl, i-propyl, n-butyl, i-butyl, tert.-butyl, n-pentyl, i-pentyl, n-hexyl, n-heptyl, n-octyl, phenyl, benzyl, 1-phenylethyl, 2-phenylethyl, 3-phenylpropyl, 4-phenylbutyl or 5-phenylpentyl.

Specific examples of very suitable esters (b) are ethyl acetate, butyl acetate, ethyl propionate, ethyl n-butyrate, ethyl n-valerate, ethyl phenylacetate, ethyl 3-phenylpropionate, ethyl 4-phenylbutyrate, butyl acrylate and butyl methacrylate.

The liquid hydrocarbon (c), additionally employed, is of the type which can be brought into contact with conventional titanium-containing components of Ziegler-Natta catalysts without detriment to the catalyst or to its titanium-containing component, for example hydrocarbons employed in the polymerization of α-monoolefins. Examples of suitable materials are pentanes, hexanes, heptanes, gasolines and cyclohexane.

The oxygen-containing compound (d) also employed in preparing the titanium-III component can be an ether ($d_1$) having the stated formula or an ester ($d_2$) having the stated formula.

Suitable ethers ($d_1$) are the relevant conventional compounds which have the stated formula, especially those where $R^8$ and $R^{8'}$ are methyl, ethyl, propyl, butyl, amyl, hexyl or phenyl. Suitable compounds of this type are described, for example, in U.S. Pat. No. 3,116,274.

Specific examples of very suitable ethers ($d_1$) are di-n-propyl ether, di-n-butyl ether, di-iso-pentyl ether, di-n-amyl ether, di-n-hexyl ether, methyl phenyl ether, ethyl phenyl ether and especially di-n-butyl ether.

Suitable esters ($d_2$) are again the relevant conventional compounds corresponding to the stated formula, especially those where $R^9$ is hydrogen, methyl, ethyl, n-propyl, n-butyl, n-pentyl, i-pentyl, n-hexyl, n-heptyl, n-octyl, n-nonyl, n-decyl, n-undecyl, n-dodecyl, phenyl, benzyl, 1-phenylethyl, 2-phenylethyl, 3-phenylpropyl, 4-phenylbutyl or 5-phenylpentyl and $R^{9'}$ is methyl, ethyl, propyl, n-butyl, n-pentyl, i-pentyl, n-hexyl or benzyl.

Specific examples of very suitable esters ($d_2$) are ethyl caproate, ethyl pelargonate and ethyl laurate.

(2) The aluminum-alkyl component.

Suitable aluminum-alkyl components having the stated formula are the relevant conventional compounds corresponding to this formula; they are very well known from the literature and from industrial practice, and therefore need not be discussed in more detail here. An exceptionally well-known example is diethyl-aluminum chloride.

(3) The phenolic compounds advantageously used as an additional component.

Typical examples of very suitable compounds having the stated formula (I) are those where $R^5$ is tert.-butyl, $R^6$ is hydrogen or tert.-butyl, $R^7$ is hydrogen or lower alkyl, eg. methyl, ethyl, n-propyl, i-propyl, n-butyl, i-butyl or tert.-butyl and o is 1. Other important compounds are those where $R^5$ and $R^6$ are as stated above and $R^7$ has the formula

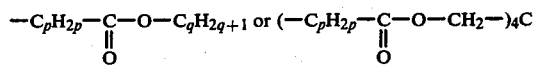

(where o is 1)    (where o is 4)

where p is an integer from 0 to 5, especially from 1 to 4, q is an integer from 1 to 24, especially from 1 to 18, and the groups $-C_pH_{2p}-$ and $-C_qH_{2q+1}-$ are preferably straight chains.

Specific examples of very suitable compounds having the stated formula (I) are 1-hydroxy-2,6-di-tert.-butylbenzene, 4-hydroxy-3,5-di-tert.-butyltoluene, the esters of β-(4'-hydroxy-3',5'-di-tert.-butylphenyl)propionic acid with methanol, ethanol, n-propanol, n-butanol, n-octanol, n-dodecanol or n-octadecanol and the tetraester of the same acid with pentaerythritol, as well as 1,3,5-trimethyl-2,4,6-tris-(3,5-di-tert.-butyl-4-hydroxybenzyl)-benzene.

Typical examples of very suitable compounds having the stated formula (II) are those in which the acid moiety is derived from 2-hydroxy-4-naphthoic acid, 1-hydroxy-2-naphthoic acid, 2-hydroxy-1-naphthoic acid or 1-hydroxy-8-naphthoic acid and the alcohol moiety from n-octanol, n-dodecanol or n-octadecanol.

Specific examples of very suitable compounds having the stated formula (II) are n-octadecyl 2-hydroxy-4-naphthoate, n-dodecyl 1-hydroxy-8-naphthoate, n-octadecyl 1-hydroxy-8-naphthoate, n-octyl 1-hydroxy-2-naphthoate and n-octadecyl 2-hydroxy-1-naphthoate.

The preparation of the novel titanium-III component is simple and lies, without additional explanation, within the abilities of a skilled worker. However, the following points may be noted:

Step (E) is advantageously implemented if a particularly narrow particle size distribution is desired.

Step (F) in general has the effect that the productivity of the catalyst system is slightly reduced, but a markedly coarser polymer particle is obtained.

Step (G) is advantageously implemented if step (F) yields an agglomerated product.

In implementing step (H), ie. preparing the corresponding suspension, we have often found it advantageous first to combine the solid with a relatively small amount of the hydrocarbon and then to add the total amount of oxygen-containing compound together with the remaining amount of hydrocarbon.

In implementing step (I), the suspension must be agitated vigorously, which is most simply effected by stirring.

The process according to the invention allows homopolymers and copolymers of $C_2$-$C_6$-α-monoolefins to be prepared in an advantageous manner; particularly suitable α-monoolefins are propylene, but-1-ene and 4-methylpent-1-ene and, for copolymerizations, ethylene.

EXAMPLE 1

Preparation of the titanium-III component (I)

A titanium-containing compound (a) of the formula $TiCl_3.0.33 AlCl_3$, and ethyl phenylacetate as the ester (b), are milled as follows:

(A) a vibratory ball mill giving a milling acceleration of 46 m.sec$^{-2}$ is employed, (B) the mill is first charged with the titanium-containing compound (a) and run at +38° C. for a period of 18 hours in the absence of a diluent, then (C) whilst milling at −12° C., the amount of ester (b) corresponding to a molar ratio of titanium in the titanium-containing compound (a) to ester (b) of 1:0.3 is added continuously at a rate of 12 ml/minute per 2.5 kg of titanium-containing compound (a), in the absence of a diluent, thereafter (D) the mixture is milled for a period of 44 hours at +40° C., hereupon (E) the product obtained according to (D) is milled further for a period of 15 minutes at −20° C. in the absence of a diluent and then (F) the product obtained according to (E) is kept at +45° C. for a period of 140 hours, without milling. Step (G) is omitted.

In accordance with the invention, the further procedure is that (H) a suspension is prepared from ($H_1$) 1 part by weight of the product obtained according to (F), ($H_2$) 0.8 part by weight of n-heptane as the hydrocarbon (c) and ($H_3$) di-iso-pentyl ether as the oxygen-containing compound (d), in an amount corresponding to a molar ratio of titanium from the titanium-containing compound (a) to oxygen-containing compound (d) of 1:0.13, thereafter (I) the suspension obtained according to (H) is kept at +70° C. for a period of 30 minutes, with vigorous stirring, and is then brought to +25° C., and then (J) the solid is isolated from the suspension obtained according to (I), washed with n-heptane and dried, the isolated solid thus obtained constituting the titanium-III component (1).

Polymerization by means of the titanium-III component (1)

1.0 g of the titanium-III component (1) and 1.8 g of diethyl-aluminum chloride (2), corresponding to an atomic ratio of titanium from (1) to aluminum from (2) of about 1:3.8, are introduced into a 2 liter stirred flask charged with 1.5 liters of dry heptane. Polymerization is then carried out for 5 hours at 60° C. under a propylene pressure of 1 bar (the temperature and pressure being kept constant by suitable regulating systems), after which the polymerization is stopped by adding 20 ml of methanol. The suspension medium is then removed by distillation.

Data on the polypropylene obtained are to be found in the Table given later.

EXAMPLE 2

Preparation of the titanium-III component (1)

A titanium-containing compound (a) of the formula $TiCl_3.0.33AlCl_3$, and ethyl phenylacetate as the ester (b), are milled as follows:

(A) a vibratory ball mill giving a milling acceleration of 48 m.sec$^{-2}$ is employed, (B) the mill is first charged with the titanium-containing compound (a) and run at +35° C. for a period of 15 hours in the absence of a diluent, then (C) whilst milling at −16° C., the amount of ester (b) corresponding to a molar ratio of titanium in the titanium-containing compound (a) to ester (b) of 1:0.3 is added continuously at a rate of 15 ml/minute per 2.5 kg of titanium-containing compound (a), in the absence of a diluent, thereafter (D) the mixture is milled for a period of 64 hours at +40° C., hereupon (E) the product obtained according to (D) is milled further for a period of 10 minutes at −25° C. in the absence of a diluent and then (F) the product obtained according to (E) is kept at +90° C. for a period of 8 hours, without milling, and is then loosened somewhat. Step (G) is omitted.

In accordance with the invention, the further procedure is that (H) a suspension is prepared from ($H_1$) 1 part by weight of the product obtained according to (F), ($H_2$) 1.5 parts by weight of n-heptane as the hydrocarbon (c) and ($H_3$) ethyl laurate as the oxygen-containing compound (d), in an amount corresponding to a molar ratio of titanium from the titanium-containing compound (a) to oxygen-containing compound (d) of 1:0.13, thereafter (I) the suspension obtained according to (H) is kept at +90° C. for a period of 30 minutes, with vigorous stirring, and is then brought to +20° C., and then (J) the solid is isolated from the suspension obtained according to (I), washed with n-heptane and dried, the isolated solid thus obtained constituting the titanium-III component (1).

Polymerization by means of the titanium-III component (1)

This is carried out as in Example 1; data relating to the polypropylene obtained are again shown in the Table given later.

EXAMPLE 3

Preparation of the titanium-III component (1)

This is carried out in the same manner as in Example 1, but using, in place of di-iso-pentyl ether, an equimolecular amount of di-n-butyl ether as the oxygen-containing compound (d).

Polymerization by means of the titanium-III component (1)

The following are introduced into a stirred pressure vessel, with exclusion of air and moisture: 8 kg of liquid propylene, 18 liters (S.T.P.) of hydrogen (as a molecular weight regulator), 2.16 g of diethyl-aluminum chloride (2), an amount (0.7 g) of the titanium-III component (1) which corresponds to an atomic ratio of titanium from (1) to aluminum from (2) of 1:6.5, and an amount (0.53 g) of n-octadecyl-β-(4'-hydroxy-3',5'-di-tert.-butylphenyl) propionate (3) which corresponds to a molar ratio of (2) to (3) of 18:1.

The actual polymerization is carried out with propylene at 70° C., under a monomer pressure of 32 bar, for 2 hours, whilst stirring, after which it is stopped by releasing the pressure and the polypropylene formed is isolated in a conventional manner; its data are shown in the Table.

EXAMPLE 4

Preparation of the titanium-III component (1)

This is carried out in the same manner as in Example 2, but using, in place of ethyl laurate, an equimolecular amount of ethyl pelargonate as the oxygen-containing compound (d).

Polymerization by means of the titanium-containing component

The reaction is carried out in a bed of 250 kg of a finely divided propylene polymer, in the absence of a solvent or diluent, in a stirred reactor of 0.8 m³ capacity, under a propylene pressure of 29 bar, at 72° C. (the pressure and temperature being kept constant by suitable regulating systems), with hydrogen introduced at a rate of 75 liters (S.T.P.)/h. The reactor is operated continuously by introducing, each separately from the others, 16.5 g/h of the titanium-III component (1), 53.3 g/h of diethyl-aluminum chloride (2) and 16.5 g/h of the same phenolic compound (3) as in Example 3. Accordingly, the atomic ratio of titanium from (1) to aluminum from (2) is about 1:7 and the molar ratio of (2) to (3) is about 14:1.

The product obtained from the reactor is a finely divided polypropylene, whose data are also shown in the Table below.

In the Table the symbols have the following meanings:

Spec. Yield=parts by weight of polymer obtained per part by weight of titanium in the titanium-III component.
HS;%=proportion of the polymer, in %, which is soluble in boiling n-heptane.
XS;%=proportion of the polymer, in %, which is soluble in boiling xylene.
xyz;%=percentage of the polymer having a particle diameter of less than xyz μm.
[η]=intrinsic viscosity in dl/g.
./.=not determined.

TABLE

| Example | Spec. Yield | HS % | XS; % | <100; % | <250; % | <500; % | [η] |
|---|---|---|---|---|---|---|---|
| 1 | 680 | ./. | ./. | 0.4 | 2.5 | 10 | ./. |
| 2 | 603 | ./. | ./. | 0.6 | 3.7 | 12.4 | ./. |
| 3 | 19,800 | 3.4 | ./. | ./. | ./. | 4.0 | 2.5 |
| 4 | 22,200 | 2.1 | 2.1 | ./. | 7.5 | ./. | 2.5 |

We claim:
1. In a process for the preparation of homopolymers and copolymers of $C_2$-$C_6$-α-monoolefins at from 20° to 160° C., under a pressure of from 1 to 100 bar, by means of a Ziegler-Natta catalyst system comprising
 (1) a titanium-III component, in the preparation of which

(1.1) a titanium-containing compound (a) of the formula $$TiCl_3 . nAlCl_3$$

where n is a number from 0.01 to 1, and (1.2) an ester (b), which in total contains from 2 to 34 carbon atoms, and has the formula $$R^1-O-CO-R^2 \quad \text{or}$$
 $$R^1-O-CO-\underset{R^2}{C}=\underset{R^2}{CH}$$

where
 $R^1$ is (I) alkyl of 1 to 16 carbon atoms, or (II) phenylalkyl of a total of 7 to 23 carbon atoms, in which up to 5 hydrogens of the phenyl may be substituted by alkyl of 1 to 4 carbon atoms, and
 $R^2$ is (I) hydrogen, (II) alkyl of 1 to 18 carbon atoms, (III) phenylalkyl of a total of 7 to 23 carbon atoms, in which up to 5 hydrogens of the phenyl may be substituted by alkyl of 1 to 4 carbon atoms, (IV) phenyl or (V) alkylphenyl of a total of 7 to 23 carbon atoms, in which up to 5 hydrogens of the phenyl may be substituted by alkyl of 1 to 4 carbon atoms, are subjected to a milling treatment wherein
 (A) a vibratory ball mill having a milling acceleration of from 30 to 80 m.sec$^{-2}$ is used,
 (B) the mill is first charged with the titanium-containing compound (a) and, if appropriate, is run at from $-50°$ to $+100°$ C. for a period of from 0.5 to 100 hours, in the absence of a diluent, then
 (C) whilst milling the charge at from $-50°$ to $+80°$ C. the amount of the ester (b) which corresponds to a molar ratio of titanium in the titanium-containing compound (a) to ester (b) of from 1:1.5 to 1:0.01 is added continuously, or a little at a time, in the absence of a diluent, at a rate of from 0.01 to 200 ml/min per 2.5 kg of titanium-containing compound (a), thereupon
 (D) the charge is milled for a period of from 1 to 120 hours at from $+15°$ to $+100°$ C., hereupon
 (E) the product obtained according to
 (D) is milled further for a period of from 0.5 to 60 minutes at from $-50°$ to $+5°$ C. in the absence of a diluent, then
 (F) the product obtained according to (D) or (E) is kept, without milling, at from $+20°$ to $+150°$ C. for a period of from 0.25 to 300 hours, the improvement comprising thereafter
 (H) a suspension is prepared from
 ($H_1$) 1 part by weight of the product obtained according to (D), (E), (F) or (G),
 ($H_2$) from 0.5 to 20 parts by weight of a hydrocarbon (c) which is liquid under normal conditions and boils below 150° C., and
 ($H_3$) an oxygen-containing compound (d), consisting of
 ($d_1$) an ether which in total contains from 4 to 30 carbon atoms, and has the formula $$R^8-O-R^{8'}$$

where $R^8$ and $R^{8'}$ may be identical or different and each is (I) alkyl of 1 to 15 carbon atoms, (II) phenyl or (III) alkylphenyl of a total of 7 to 14 carbon atoms, and/or (d₂) an ester which in total contains from 2 to 34 carbon atoms, and has the formula

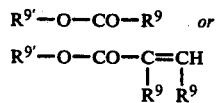

where
R⁹ is (I) hydrogen, (II) alkyl of 1 to 12 carbon atoms, (III) phenylalkyl of a total of 7 to 14 carbon atoms, in which 1 hydrogen of the phenyl may be substituted by alkyl, (IV) phenyl or (V) alkylphenyl of a total of 7 to 14 carbon atoms, and
R⁹' is (I) alkyl of 1 to 8 carbon atoms, (II) phenyl or (III) phenylalkyl of a total of 7 to 14 carbon atoms, in such amount that the molar ratio of titanium from the titanium-containing compound (a) to oxygen-containing compound (d) is from 1:0.01 to 1:2, thereafter (I) the suspension obtained according to (H) is kept at from +40° to +140° C., for from 5 to 120 minutes, with vigorous agitation, and is then brought to from +15° to +25° C., and hereupon (J) the solid is isolated from the suspension obtained according to (I), and, if desired, is washed with a hydrocarbon which is liquid under normal conditions and boils below 150° C., and is dried, the novel titanium-III component (1) being the solid, in suspended form, obtained according to (I) or the solid, in isolated form, obtained according to (J).

* * * * *